J. A. LIND.
FUEL HEATING ATTACHMENT FOR ENGINES.
APPLICATION FILED MAR. 2, 1921.
1,434,445.
Patented Nov. 7, 1922.
2 SHEETS—SHEET 2.
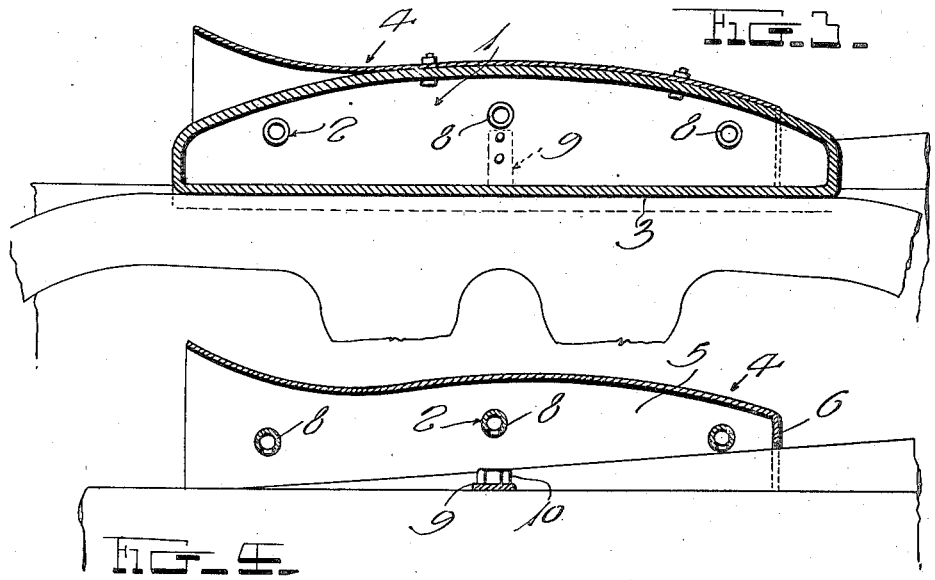
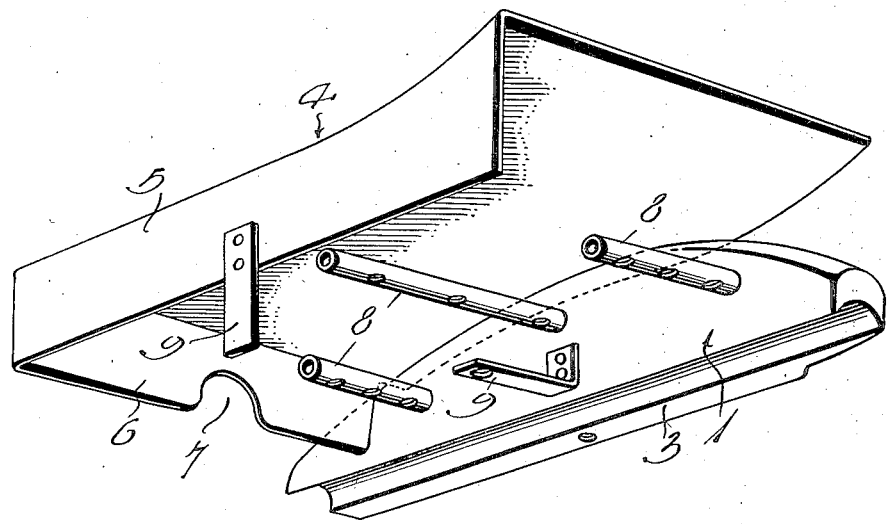
Witness
H. Woodard
Inventor
John A. Lind
By H. B. Wilson &co
Attorneys Patented Nov. 7, 1922.

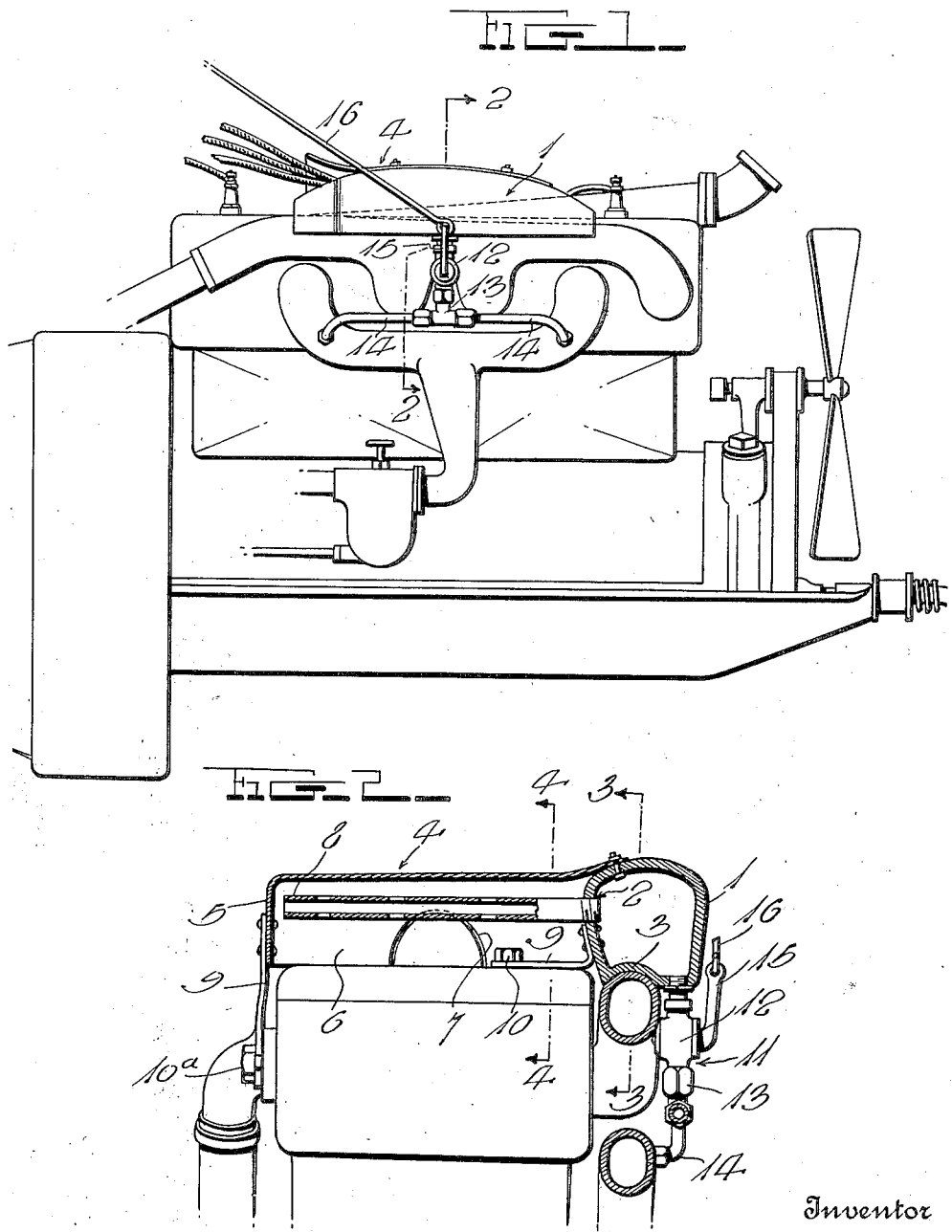

1,434,445

UNITED STATES PATENT OFFICE.

JOHN A. LIND, OF BROCKTON, MASSACHUSETTS.

FUEL-HEATING ATTACHMENT FOR ENGINES.

Application filed March 2, 1921. Serial No. 449,221.

*To all whom it may concern:*

Be it known that I, JOHN A. LIND, a citizen of the United States, residing at Brockton, in the county of Plymouth and State of Massachusetts, have invented certain new and useful Improvements in a Fuel-Heating Attachment for Engines; and I do declare the following to be a full, clear, and exact description of the invention, such as will enable others skilled in the art to which it appertains to make and use the same.

This invention relates to an improved device adapted to be attached to an internal combustion engine for heating the fuel supplied thereto, the same being especially, although not necessarily, designed for use in connection with automobile engines.

The principal object of the invention is to generally improve upon similar patented devices of this class by the provision of one of extreme simplicity and durability which embodies a hood to extend over a portion of the engine and confine air beneath it to be warmed by the heat radiating from the engine, together with a casing which carries the hood, the casing being intended to be mounted on the exhaust manifold and serving to superheat the warm air supplied thereto, a suitable valved conduit, controlled from the operator's seat, leading from this casing to the intake manifold into which the hot air is finally fed in order to produce an extremely desirable and efficient mixture, whereby the mileage obtained from a gallon of gasoline will be nearly doubled.

Another object of the invention is to provide a device of this class which is of such construction that it can be installed on an automobile engine by unskilled hands, the same being of such construction that it does not interfere with the wiring leading from the coil box to the spark plugs.

A further object of the invention is to provide a device of this class wherein the aforesaid hood for the engine has the additional function of serving as a shield to deflect rain water from at least two of the spark plugs.

Other features and advantages of my invention will be apparent as the description goes on.

In the accompanying drawings forming a part of this specification and in which like numerals are employed to designate like parts throughout the same:

Figure 1 is an elevational view of a conventional type of automobile engine equipped with a fuel heating attachment constructed in accordance with this invention.

Figures 2, 3, and 4 are enlarged sectional views taken on the planes of the lines 2—2, 3—3, and 4—4 of Figs. 1 and 2 respectively.

Figure 5 is an enlarged detail perspective view of the attachment removed from the engine, the valved conduit being removed.

Since I have illustrated my improved fuel heating attachment as being used in connection with a conventional type of automobile engine, it is thought unnecessary to refer by numerals to any parts of the engine, as all parts thereof are well known and are merely disclosed for the sake of clearness.

In carrying out the invention, I make use of an elongated hollow casting or casing 1, the same being formed in one of its vertical sides with a plurality of inlet openings 2 and being formed in its bottom with a longitudinal channel or depression 3 which extends throughout its entire length and is adapted to fit over the correspondingly shaped portion of the exhaust manifold. Detachably or otherwise secured to the top of the casing 1 and extending laterally therefrom and over a portion of the engine, is the aforesaid hood 4. This hood by preference is in the form of a sheet metal plate of substantially the same length as the casing. In order to form this plate into a hood, at least two of its free edges are bent down at right angles to form depending flanges 5 and 6 which rest on top of the engine in the manner shown. The flange 6 is provided with a notch 7 to fit over the water outlet pipe on the engine which projects slightly above the body portion near the forward end of the engine. The rear end of the hood is left open, the forward end thereof being directed upwardly as shown so as not to interfere with the wiring that must pass beneath it. This open end of the hood also functions to permit cool air to pass beneath the hood. It is understood that the air which is confined beneath this hood is warmed by the heat which radiates from the engine and this warm air is intended to be supplied to the casing 1 where it is superheated before passing into the intake manifold. In order to restrict the amount of air passing from the hood into the casing, I make use of a plurality of horizontal apertured pipes 8 which extend beneath the hood in the manner shown and are threaded into the openings 2 of the casing. Any suitable means such as apertured straps 9 may be associated with the device for holding it in position on the exhaust manifold and engine. Bolts 10 and 10ª are passed through the apertures in the straps to hold the latter in place. At this point, I wish to state, that it is not necessary to employ additional bolts for this purpose, as the bolt 10 happens to be one of the bolts that serves to hold the cylinder head on the engine block while the bolt 10ª is one of the bolts that serves to connect the water-return pipe with the side of the water jacket.

As before intimated, after the air has been superheated within the hollow casing 1, it is supplied to the intake manifold. To accomplish this, I make use of a suitable conduit or passage designated generally by the numeral 11. By preference, this conduit includes a valve 12 which is directly connected with the casing 1, a T-coupling 13, and oppositely extending tubes 14, which extend into the intake manifold in the manner disclosed. At this point, I wish to state that the valve 12 includes a lever or handle 15 and connected to this handle is an operating rod 16 which leads to a suitable point within convenient reach of the operator to permit the valve to be opened and closed, at the will of the operator, from his seat.

A careful consideration of the foregoing description taken in connection with the drawings should be sufficient to enable persons skilled in the art to obtain a clear understanding of the same. However, a brief review of the manner of operation may well be entered at this point. To this end, and assuming that the engine is in operation, it will be seen that air which is confined beneath the hood 4 becomes heated from the engine and is sucked through the pipes 8 and delivered into the casing 1, where it is superheated before passing through the conduit 11 and into the intake manifold. The quantity of air admitted to the manifold may be governed by manipulating the operating rod 16 which will open or close the valve 12 to the desired degree. By supplying this hot air into the intake manifold, it will be mixed with the fuel and thus provide an extremely desirable and effective mixture. Practical use of this device will disclose the fact that by mixing this hot air with the fuel, the mileage obtained from each gallon of gasoline is practically doubled. It will therefore be seen that a device of this type may be used to an advantage by automobilists.

The several features and advantages of the invention have now been made apparent from the foregoing description and it is therefore thought that a more lengthy and detailed description is unnecessary.

Since probably the best results may be obtained with the construction and arrangement of parts herein shown and described, this construction and arrangement is elected as the preferred embodiment of the invention. However, I wish it to be understood that various minor changes within the scope of the subjoined claims may be resorted to.

I claim:

1. A fuel heater for use on internal combustion engines comprising a hollow apertured casing for super-heating warm air sucked into it by the engine, said casing being intended to be arranged on the exhaust manifold, an open-ended hood associated with said casing, said hood being designed to extend over the engine for confining air therebeneath to become heated, means for conveying air from the hood through the apertures in said casing, and a valved conduit leading from the casing for connection to the intake manifold.

2. A device of the class described comprising a hollow elongated casing constituting a superheater for warm air, being formed in one side with openings and in its bottom with a channel for reception of a portion of the exhaust manifold, a sheet of metal attached to said casing and extending laterally therefrom, being intended to overlie a portion of the engine and confine air therebeneath to be heated, at least two of the edges of said sheet being bent down to form flanges to bear on the engine, the flanges together with the casing forming an open-ended chamber beneath said sheet, a plurality of horizontal apertured pipes fitted into the side openings in said casing and extending into said chamber to deliver warm air from the latter to the interior of the casing where it is superheated, and a valved conduit leading from the casing, being designed to be connected to the intake manifold.

3. In a fuel heater for internal combustion engines, a hollow elongated casing formed in one side with openings and formed in the bottom with a channel for reception of the exhaust manifold, a valved conduit leading from said casing and intended to be connected with the intake manifold, and a plurality of horizontal pipes connected with the casing and intended to overlie the engine, said pipes being open at their ends and formed between their ends with a plurality of apertures to permit entrance of the heated air to be conveyed into the casing to be superheated.

4. In a fuel heater for internal combustion engines, an air collecting hood adapted for disposition over the engine, said hood being formed from a sheet of metal having two of its edges downturned to provide the flanges for contact with the engine, one edge of said sheet being intended to be connected with a heater to be arranged on the exhaust manifold and the other edge being spaced above the engine to permit the entrance of air into the hood from this end of the latter.

In testimony whereof I have hereunto set my hand.

JOHN A. LIND